US011785902B2

(12) United States Patent
Ketonen

(10) Patent No.: US 11,785,902 B2
(45) Date of Patent: *Oct. 17, 2023

(54) FEEDING APPARATUS FOR A TREE HARVESTER

(71) Applicant: Lauri Ketonen, Kristiinankaupunki (FI)

(72) Inventor: Lauri Ketonen, Kristiinankaupunki (FI)

( * ) Notice: Subject to any disclaimer, the term of this patent is extended or adjusted under 35 U.S.C. 154(b) by 52 days.

This patent is subject to a terminal disclaimer.

(21) Appl. No.: 17/399,204

(22) Filed: Aug. 11, 2021

(65) Prior Publication Data

US 2021/0368698 A1 Dec. 2, 2021

Related U.S. Application Data

(63) Continuation-in-part of application No. 16/339,018, filed as application No. PCT/FI2017/050734 on Oct. 23, 2017, now Pat. No. 11,134,623.

(30) Foreign Application Priority Data

Oct. 21, 2016 (FI) ...................................... 20165800

(51) Int. Cl.
*A01G 23/095* (2006.01)

(52) U.S. Cl.
CPC .................................. *A01G 23/095* (2013.01)

(58) Field of Classification Search
CPC .... A01G 23/08; A01G 23/083; A01G 23/085; A01G 23/087; A01G 23/091; A01G 23/093; A01G 23/095
See application file for complete search history.

(56) References Cited

U.S. PATENT DOCUMENTS

| 5,996,658 | A | 12/1999 | Alhainen |
| 7,185,686 | B2 * | 3/2007 | Ketonen ................. B27B 25/04 144/246.1 |
| 7,225,842 | B2 | 6/2007 | Isley |
| 7,644,580 | B2 | 1/2010 | Alfthan |
| 7,938,154 | B2 * | 5/2011 | Quirke .................... B27B 25/02 144/34.1 |
| 9,232,701 | B1 | 1/2016 | Peterson |
| 9,591,810 | B2 | 3/2017 | Bisballe |
| 10,602,681 | B2 | 3/2020 | Lundgren |
| 11,051,465 | B2 * | 7/2021 | Matsumoto .......... A01G 23/095 |
| 2005/0098231 | A1 | 5/2005 | Alftan |
| 2006/0278305 | A1 | 12/2006 | Barlow et al. |
| 2007/0125447 | A1 | 6/2007 | Alfthan |

FOREIGN PATENT DOCUMENTS

| EP | 2944189 | 11/2015 |
| WO | 99/41972 | 8/1999 |

* cited by examiner

*Primary Examiner* — Matthew Katcoff
(74) *Attorney, Agent, or Firm* — ZIEGLER IP LAW GROUP LLC

(57) ABSTRACT

The invention relates to a feeding apparatus for a harvester, which includes
opposing arms, with operating devices, pivoted to a frame, for creating transverse compression,
two opposing feed rollers installed in the arms as the only feed rollers for feeding a tree through the throat, and
hydraulic motors driving the feed rollers, and at least two pressure-medium lines operating them.

6 Claims, 9 Drawing Sheets

FEEDING APPARATUS FOR A TREE HARVESTER

CROSS REFERENCE TO RELATED APPLICATIONS

This application is a continuation-in-part of U.S. application Ser. No. 16/339,018 filed Apr. 3, 2019, the National Stage in the U.S. of PCT/FI2017/050734 filed Oct. 23, 2017, which is based on and claims priority under 35 U.S.C. 119 from Finnish Patent Application No. 20165800 filed Oct. 21, 2016.

FIELD OF THE INVENTION

The invention relates to a feeding apparatus for a harvester, which includes
opposing arms, with operating devices, pivoted to a frame, for creating transverse compression,
two opposing feed rollers installed in the arms as the only feed rollers for feeding a tree through the throat, and
hydraulic motors driving the feed rollers and at least two pressure-medium lines operating them.

BACKGROUND OF THE INVENTION

In felling machines, the branches are stripped by pulling the trunk of the tree through stripping blades conforming to the trunk.

In continuous-feed devices, either crawler tracks or a feed device consisting of several rollers are used.

A typical tractive-force requirement is 10 kN-30 kN. The very largest devices can develop a tractive force of about 50 KN. Further, when we know that a suitable stripping speed is ~4-6 m/s, in theory the power required will be 180 KW. Larger devices have a lower speed, but nonetheless a power of 200 KW is usual.

As the friction coefficient between a feed roller and a tree varies from moment to moment, the use of high power cannot be ensured without a precise distribution of the rollers' tractive force. The momentary slipping of a roller will cause "pitting" that reduces the quality of the wood. Further, a hydraulic motor can fail if it runs at high revolutions.

For these reasons, it is sought to ensure the simultaneous rotation of the rollers in the same direction. Each roller can have its own control valve, or the rollers can be connected to each other hydraulically.

The most usual way is to use two proper feed rollers and then add an extra feed roller. In this case two hydraulic motors are connected mechanically in the roller. The proper feed roller and the hydraulic motor of the second extra roller are connected in series.

The extra roller now acts as a synchronizing element for the movements of the proper feed rollers.

The problem with this is the contact of the proper feed rollers and the extra roller with the tree. With large trees, the proper feed rollers pull the tree, the extra roller acting only to synchronize. With small trees, the extra roller receives the compressive force of the actual rollers. But the construction works reasonably. Narrow rollers can be used and a wider range of commercial hydraulic motors is available.

FIG. 1 shows the construction of the most usual modern feed device. The figure shows the construction in a very simplified form. The frame structure is not shown in the figure and the hydraulic circuit is drawn in the same figure.

Roller 32 is common to motors 30 and 30.1. The diameter of the roller is about 200-300 mm. The tree 5 is thus between feed rollers 32, 33, and 33.1. Rollers 33 and 33.1, suspended on pivot points 34 and 34.1, turn according to the diameter of the tree.

Let us examine a situation, in which, for example, due to snow or ice only feed roller 33 receives tractive force, but its torque is insufficient by itself to move the tree 5.

The directional control valve 35 is now in the position "straight". Pressurized oil is not now allowed through motor 31, in which case motor 30 does not receive oil. However, the same pressure affects 31.1 and then, for example, due to ice on the surface of the tree 33.1 and 32 spin "idle". This is possible because a vacuum due to suction arises between motors 31 and 30. The situation is unusual, but for this reason an actual feed movement forwards can be made using the so-called "cross" position of the directional control valve 35. Both ways are used, but one direction is always worse.

Harvesters containing two feed-roller pairs or groups are also known. In Finnish patent FI 901119 (Sampo Hydraulics), multi-capacity motors are used to rotate two rollers, in which the second capacity of the multi-capacity motor rotating both rollers is connected in series with a separate hydraulic motor. Another solution using multi-capacity hydraulic motors is known from application publication US 2005/0098231A1 (Alftan). A four-roller harvester is known from publication EP 2944189A1 (Waratah), in which the hydraulic motors of the rollers can be connected diversely in parallel and in series. A three-roller harvester equipped with four hydraulic motors is known from application publication WO 99/41972 (Pinomäki).

It is known that the construction of a feed device using wide feed rollers is advantageous in terms of tree feed. Thanks to the wide roller, the roller's path of movement can be mainly lateral. The path of movement of a narrow roller also demands a vertical path of movement. In a wide roller, a small tree travels on the upper edge, a large tree on the lower edge. Further, twisty trees move better with two opposing rollers giving freedom to move in an up-and-down direction.

The strong bearings required by a wide roller make it difficult to find commercial hydraulic motors. In addition, the motors cannot be connected in series, due to internal leaks. For this reason, opposed, wide feed rollers are difficult to use in a totality.

Using known solutions, operation is optimal over only a narrow power range, only in one direction, or else considerable throttling must be used before the motors, which increases power losses.

The rotation of a large feed roller demands a high torque, which in known solutions leads to the use of a very large hydraulic motor. This increases the weight of the felling head unreasonably.

A large feed roller also often has the problem of the gripping surface becoming blocked particularly with bark material, when its grip weakens.

SUMMARY OF THE INVENTION

The invention is intended to eliminate the aforementioned drawbacks of the prior art and create a better harvester feed-roller arrangement than preciously. The invention is characterized by a feeding apparatus for a harvester, comprising
opposing arms, namely a first arm and a second arm, with operating devices, pivoted to a frame, for creating transverse compression, two opposing auxiliary frames, namely a first auxiliary frame and a second auxiliary frame, the first auxiliary frame being installed in the first arm and the second auxiliary frame being installed in the second arm, two opposing feed devices, namely a first feed device and a second feed device, the first feed device being installed in the first auxiliary frame and the second feed device being installed in the second auxiliary frame, the first feed device and the second feed device acting as the only feed devices for feeding a tree through a throat, wherein the feed devices both have an operating state for feeding the tree forward towards the throat, namely forward operating state, a first set of hydraulic motors installed in the first auxiliary frame, comprising a first hydraulic motor and a second hydraulic motor both driving the first feed device, thus the first feed device creating a mechanical connection between the first hydraulic motor and the second hydraulic motor of the first feed device, the first hydraulic motor having a first inlet and a first outlet and the second hydraulic motor having a second inlet and a second outlet, a second set of hydraulic motors installed in the second auxiliary frame, comprising a third hydraulic motor and a fourth hydraulic motor both driving the second feed device, thus the second feed device creating a mechanical connection between the third hydraulic motor and the fourth hydraulic motor of the second feed device, the third hydraulic motor having a third inlet and a third outlet and the fourth hydraulic motor having a fourth inlet and a fourth outlet, a tank line for returning pressure-medium from the hydraulic motors to a tank, a first parallel pressure-medium line operating the first hydraulic motor of the first feed device and the third hydraulic motor of the second feed device, wherein the hydraulic fluid in the forward operating state is fed first to the first inlet of the first hydraulic motor, from the first outlet of the first hydraulic motor to the third inlet of the third hydraulic motor, and from the third outlet of the third hydraulic motor to the tank line, when feeding tree, and a second parallel pressure-medium line operating the second hydraulic motor of the first feed device and the fourth hydraulic motor of the second feed device in series, wherein the hydraulic fluid in the forward operating state is fed first to the fourth inlet of the fourth hydraulic motor, from the fourth outlet of the fourth hydraulic motor to the second inlet of the second hydraulic motor, and from the third outlet of the third hydraulic motor to a tank line, when feeding tree.

On the basis of the analysis of the prior art, the basic point of departure of the invention is that there should be two, and only two opposing feed rollers.

When each feed roller is driven by two hydraulic motors in different pressure-medium lines, this creates a mechanical connection between the hydraulic motors and thus control of the feed of the other hydraulic motors of the feed lines with the aid of the first mentioned.

In the feeding apparatus according to the invention, there are preferably two wide feed rollers moving mainly opposite each other. Preferably parallelograms can be used to suspend the rollers.

In one preferred feeding apparatus, the forces caused by the wide feed roller are received by a separate shaft with bearings, in which case one or two hydraulic motors are installed in an auxiliary frame, which also carried the shaft. 20% (generally 10-35%) of the torque carried by the shaft of the feed roller is sufficient as the torque-carrying capacity of the bearings integrated in each hydraulic motor. In addition, there are preferably two hydraulic motors in both feed rollers, which are connected to the actual feeding part in the roller by a sprocket or chain drive.

In one preferred embodiment, the motors of the opposing rollers are separated connected to each other hydraulically, i.e. in series. For this purpose, two feed lines are formed, in which the hydraulic motors are mutually in an opposite order, i.e., for example, one hydraulic motor of the right-hand roller is first in the first line, but the same roller's second hydraulic motor is second in the second line feed line.

The invention is pre-eminently suitable for large machines, in which the diameter of the feed roller is 30-120 cm, preferably 45-70 cm. The width of the feed roller (4) is usually 75-150%, preferably 85-120% of its diameter.

In one preferred embodiment, a gear ring equipped with internal gearing is used, which is rotated by gearwheels driven by hydraulic motors. The construction is advantageous in other connections too (a single rotating gearwheel), but in this invention there are two rotating gearwheels to each feed roller.

The simplest construction involves four motors of the same size, as long as the gear ratio to the roller is the same. Further adjacent motors can be of a different size, as long as it is symmetrical in the second roller too. The gear ratio of the driving gearwheel and the internal gearing is 1:4.5±50%, preferably in the range ±15%.

The advantage of the construction is complete synchronization between the rollers. In addition, if necessary the tractive force can be fine-tuned by altering the sizes of the motors operating as pairs, as long as they are mutually of the same size. It is characteristic that in the feed stage so-called full-pressure is fed to the second motor of both rollers.

BRIEF DESCRIPTION OF THE DRAWINGS

In the following, the invention is described with examples and with reference to the accompanying figures.

DETAILED DESCRIPTION OF THE INVENTION

Figure 1:
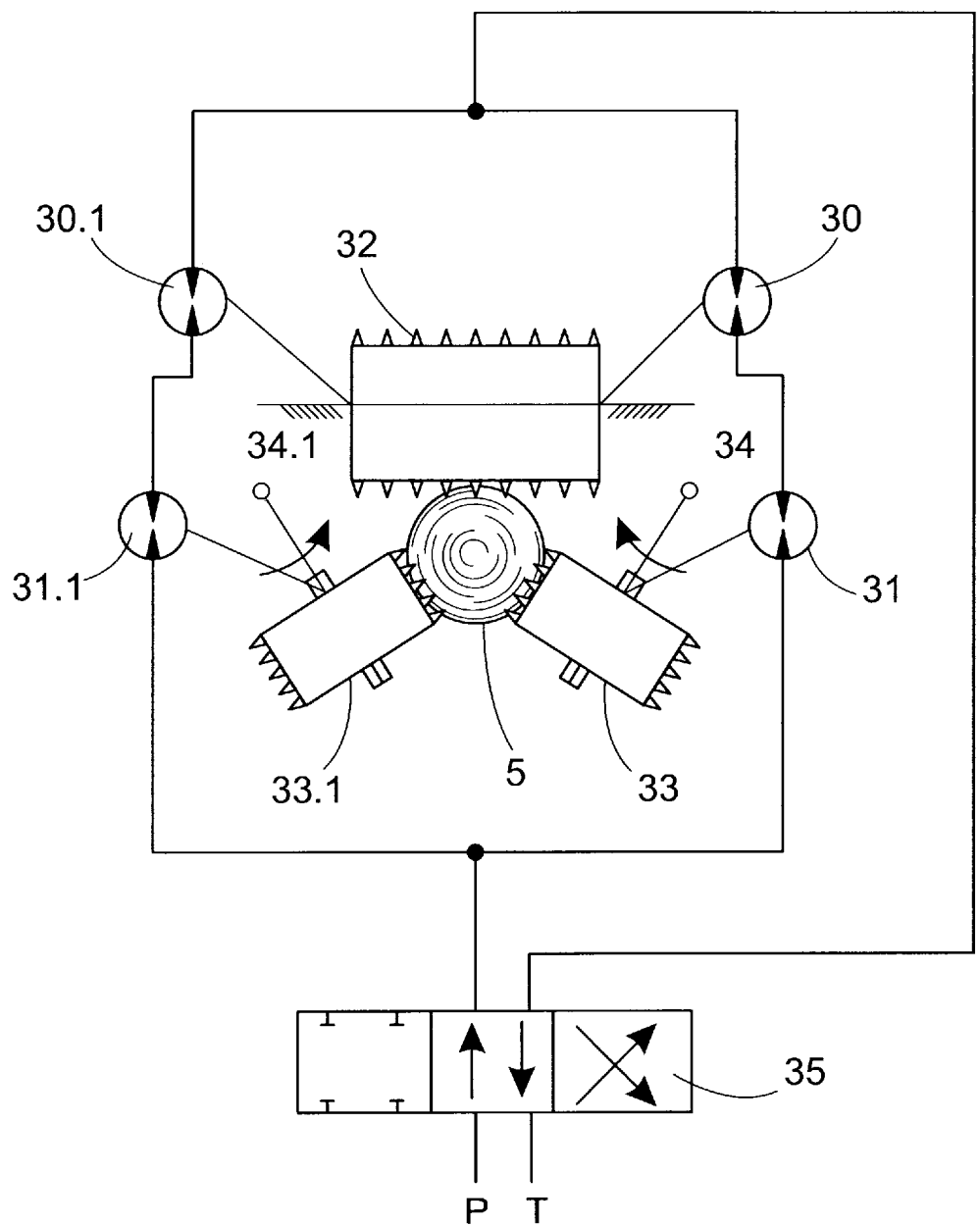
FIG. 1 shows a three-roller feeding apparatus according to the prior art.
Figure 2:
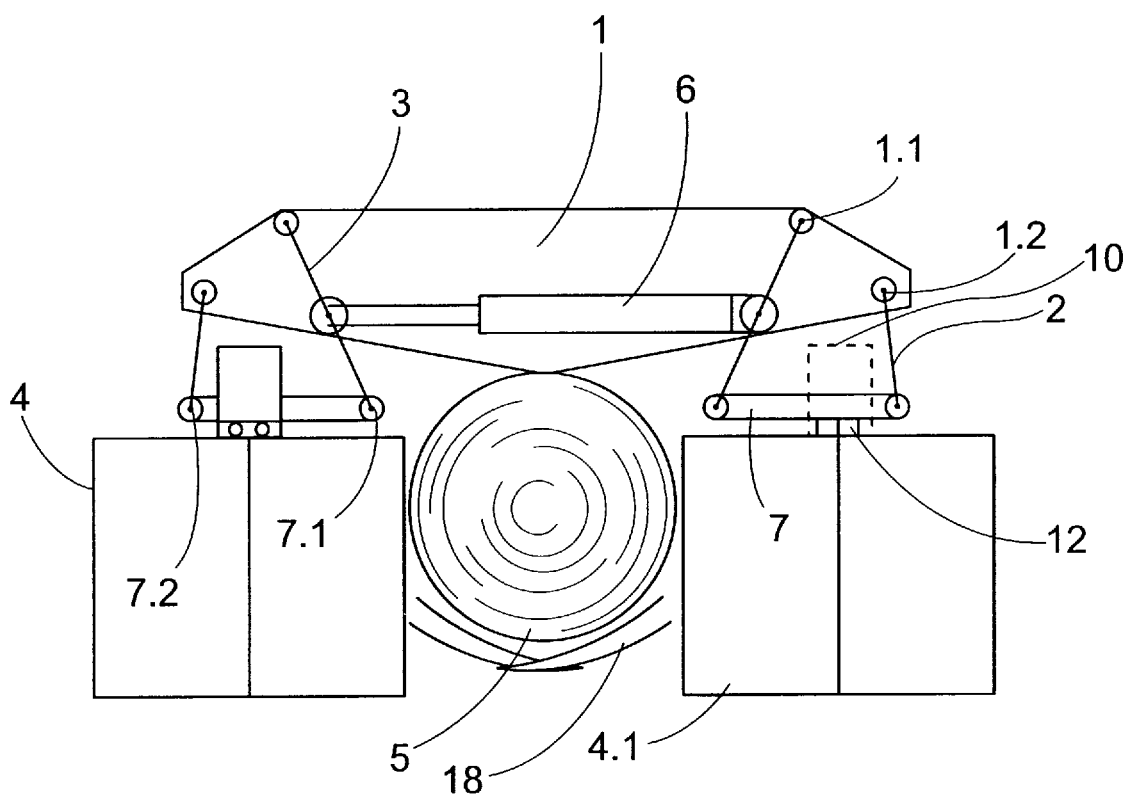
FIG. 2 shows one feeding apparatus according to the invention, seen in the direction of feeding the tree.

FIG. 2 shows one embodiment of the construction of the feeding apparatus. The pins 1.1 and 1.2 and arms 2 and 3 are suspended from the frame 1. The other end of the arms 2 and 3 is attached to the holder 7 of the roller with the aid of pins 7.1 and 7.2. A parallelogram, particularly a trapezium, is formed by the pins and arms. The hydraulic cylinder 6 moves the parallelograms around the pins 1.1 and 1.2, so that the rollers 4 move towards or away from each other. The synchronization rod is not shown. The tree 5 being fed is pressed between the rollers 4 when the cylinder 6 moves the rollers towards each other. The diameter of the roller 4 can be 300 mm or as much as 800 mm, its width 200 mm or as much as 600 mm. The roller 4 is mounted in bearings on shaft 12 of the roller holder 7. The stripping blades 40 carry the tree being processed in the throat. The path of movement of the feed rollers is thus made linear, with a maximum deviation from linearity of 1-6% of the lateral shift.

Figure 3:
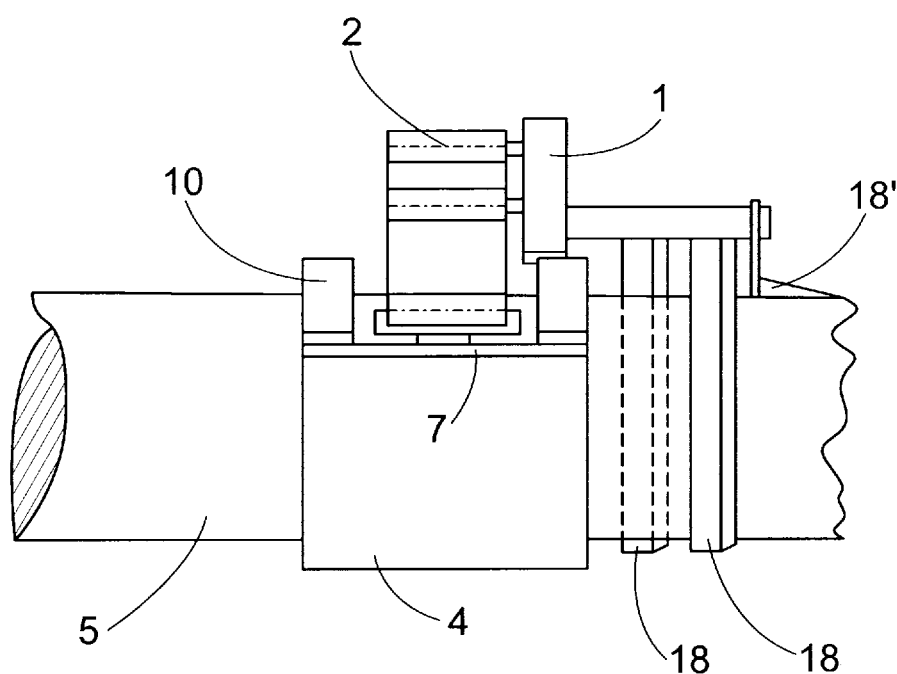
FIG. 3 shows a side view of the arrangement of FIG. 2.

It is quite advantageous that, with the aid of the pins 1.1 and 1.2, and the arms 2 and 3 and the pins 7.1 and 7.2 the parallelogram can be dimensioned in such a way that mainly the rollers 4, 4.1 are closer to each other at the lower edge than at the upper edge. Only in the fully open position is it advantageous for the lower edge to have a greater distance than the upper edge. Normally, the "opening" of the lower edge is about 1.3 times greater than the diameter of the tree 5 being fed. FIG. 3 shows a side view of the construction. In it, the stripping blades 18, 18' can be seen, normally two moving (18) and one fixed (18'). The diameter of the smallest tree to be stripped is about 50 mm, the largest max. 800 mm.

Figure 4D:
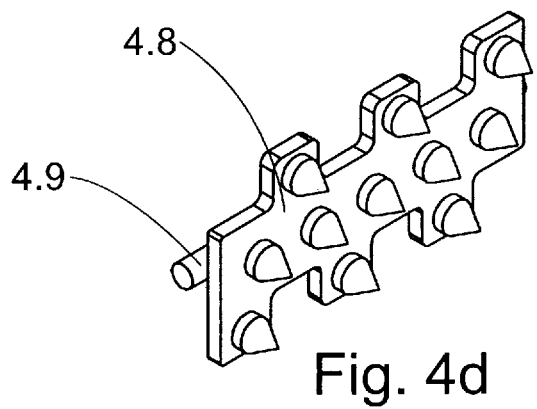
FIG. 4*d* shows the gripping element used in the feed roller of FIG. 4*c*.
Figure 4A:
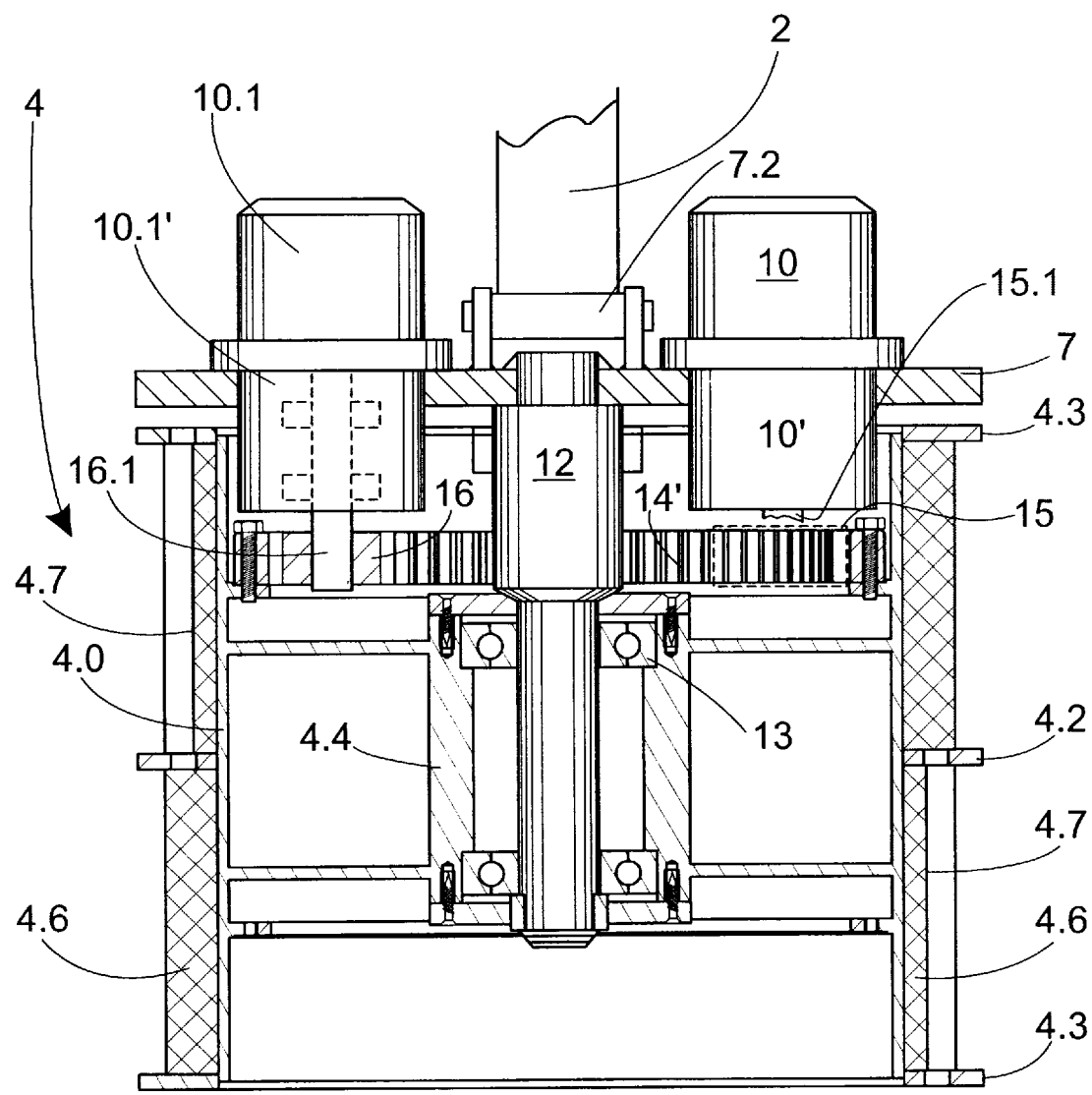
FIG. 4*a* shows one transmission arrangement of a feed roller using a new feed roller.

FIG. 4a shows the roller 4 is partial cross-section. It also shows the holder 7, shaft 12, and the hydraulic motors 10 and 10.1, as well as the bearing assemblies 10' and 10.1' of the associated drive shafts 15.1, 16.1.

This embodiment presents one construction. The shaft 12 is attached to the roller holder 7. In turn, the shaft 12 is attached to the roller 4 through the bearings 13 of part 4.4. The outer surface of the roller 4 is equipped with gripping elements in order to make the roller 4 create a feeding force. As the distance of the bearings 13 is considerable, about 25% (usually 20-40%) of the feed roller's effective diameter, it can easily create a large torque and thus a large carrying power of the compressive force. It is many times the carrying power of the driving hydraulic motors.

The gripping elements can be of any type whatever in relation to the feed roller's basic construction described above. Here a generally preferred gripping-element construction is described. The gripping elements (4.8 FIG. 4d) are not shown in this figure, but it does show the vulcanized rubber layer 4.6 of the surface of the outer cylinder 4.0 underneath them and the spiked rings 4.3 and 4.2, which divide the cylinder surface into two narrower parts. FIG. 4a shows the grooves 4.7 and holes in the spiked rings 4.2 and 4.3 made for the swing shaft 4.9 of the gripping element 4.8. The ends of each shaft 4.9 are fitted into a hole in the spiked ring at the location of the groove 4.7.

A gear ring 14 is attached to the upper edge of the roller 4. Hydraulic motors 10 and 11, namely first hydraulic motor and second hydraulic motor, equipped with a smaller gearwheel 15 and 16, are fitted to the holder 7. The first hydraulic motor 10 has first inlet a1 and first outlet b1 and correspondingly the second hydraulic motor 11 second inlet a2 and second outlet b2. The gear ratio can be preferably 1:3, even 1:7. As an internal gear ring, the construction of the ring 14' permits a more compact construction and the gearwheels can be lubricated with grease, like the rotation rings of excavators. A feeding apparatus construction using the internal gear ring according to the figure can naturally be used in other connections than the hydraulic system according to this invention and using one or more gearwheels.

Figure 4B:
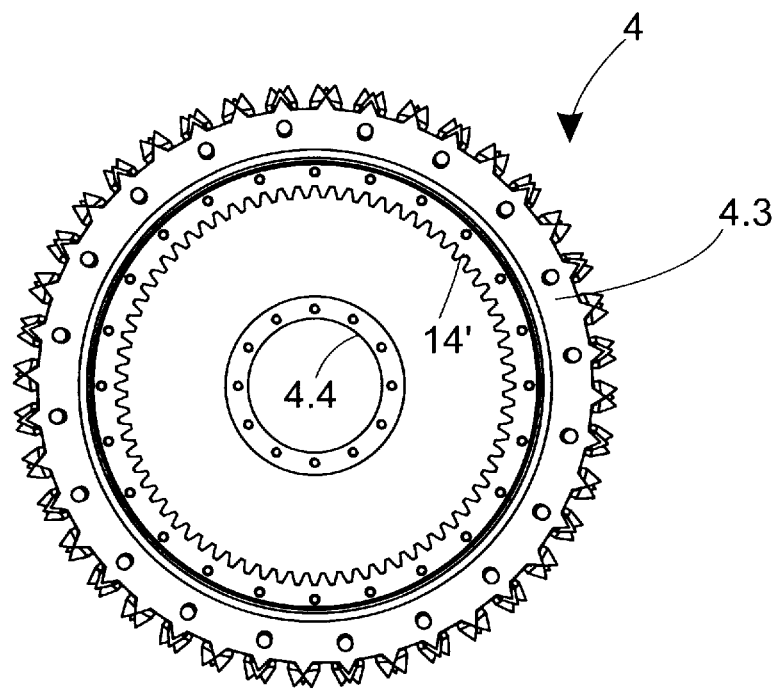
FIG. 4*b* shows an end view of the feed roller of FIG. 4*a*.
Figure 4C:
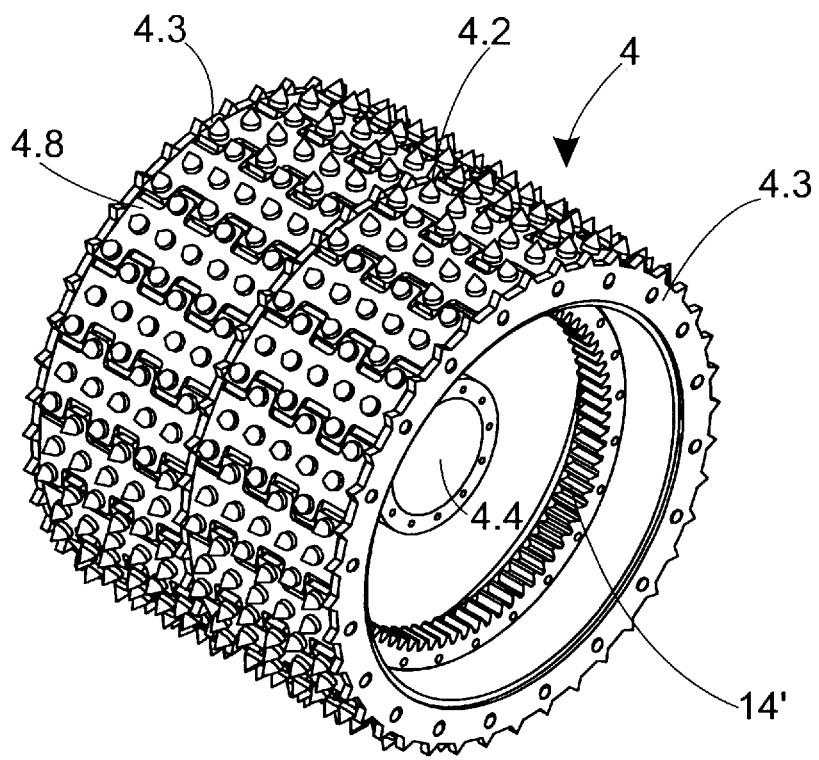
FIG. 4*c* shows an axonometric view of the feed roller of FIGS. 4*a* and 4*b*.

FIGS. 4b and 4c show the feed roller 4 as a separate totality. The gripping elements 4.8 are installed in two separate rings. FIGS. 4c and 4d show the special features of this gripping element, i.e. the tongues and their overlapping in the direction of the circumference (5-15% of the dimension of the gripping element). In such a gripping element 4.8 there is a sheet-metal component cut to shape, gripping spikes, and a swing shaft 4.9, the end of which is fitted in holes in the spiked rings 4.2 and 4.3.

In the version according to FIGS. 2, 3, and 4a, the hydraulic motors are on opposite sides relative to the rotating ring. Preferably the internal gear ring 14' is driven by two gearwheels 15, 16 which are both on the same side of the gear ring 14', being situated outside the pivots arms 2 relative to the throat and as close to each other as the motors driving them could be practically placed.

The thickness of the vulcanization is about 30 mm (generally 20-40 mm). During installation, the gripping elements 4.8 are compressed with pre-compression, when each head flexes restrainedly under load. Loading causes the gripping elements 4.8 to swing, when the tongues move relative to each other. This cleans the surface of the feed roller effectively.

Figure 5:
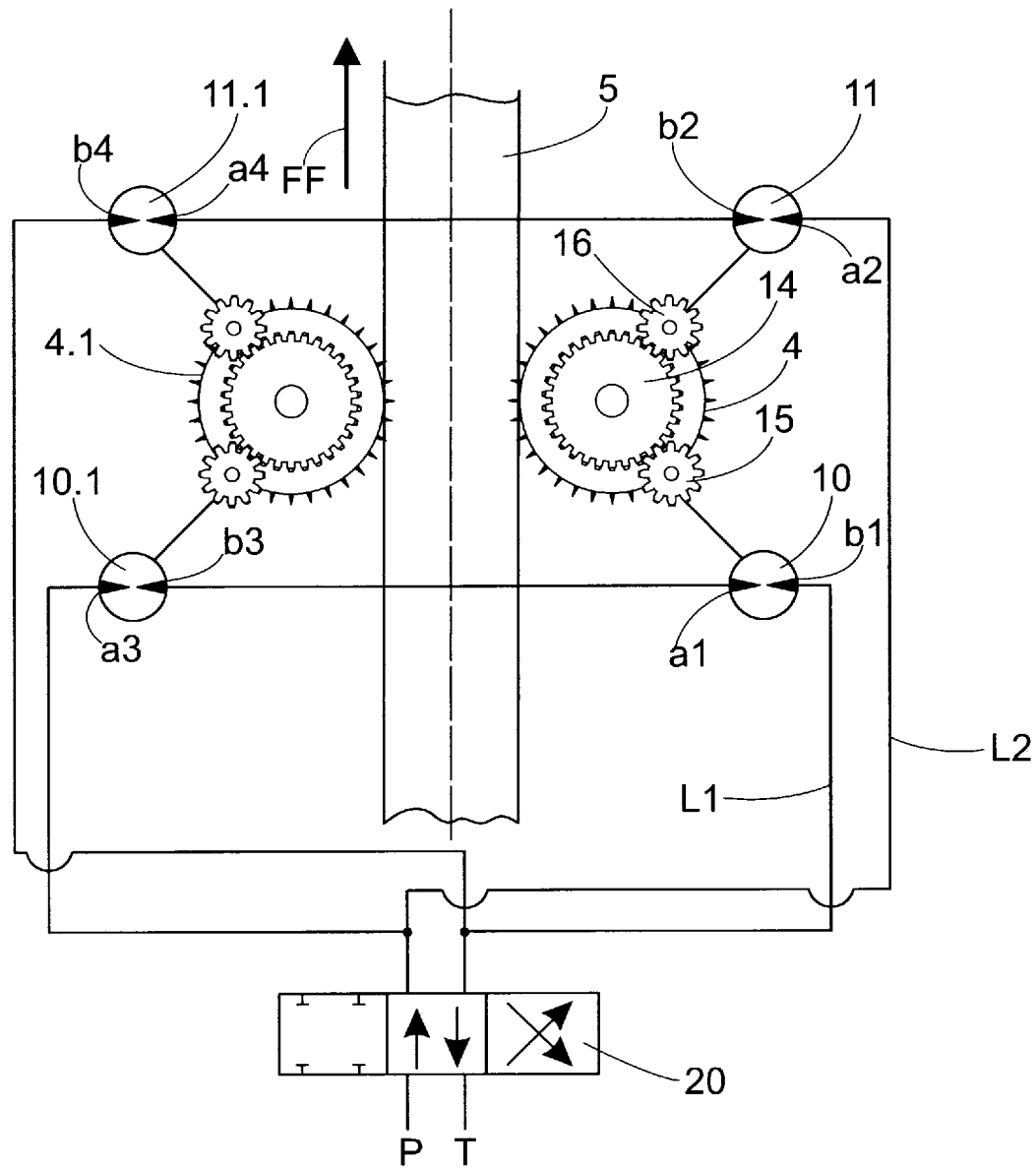
FIG. 5 shows a schematic hydraulics diagram of the feeding apparatus.

A hydraulics diagram of the feeding apparatus according to the invention in a normal situation is drawn in FIG. 5. Here, hydraulic pressure is directed to lines L1 and L2 by directional control valve 20, which are reverse-coupled, so that in the figure full pressure is directed to second hydraulic motor 11 in line L2 and third hydraulic motor 10.1 in line L1. The third hydraulic motor 10.1 has third inlet a3 and third outlet b3 and the fourth hydraulic motor 11.1 fourth inlet a4 and fourth outlet b4. Due to leakage losses, the motors in series do not produce precisely quite the same torque, but the situation in symmetrical, as the full pressure is always directed to one of the feed roller's motors.

Figure 6A:
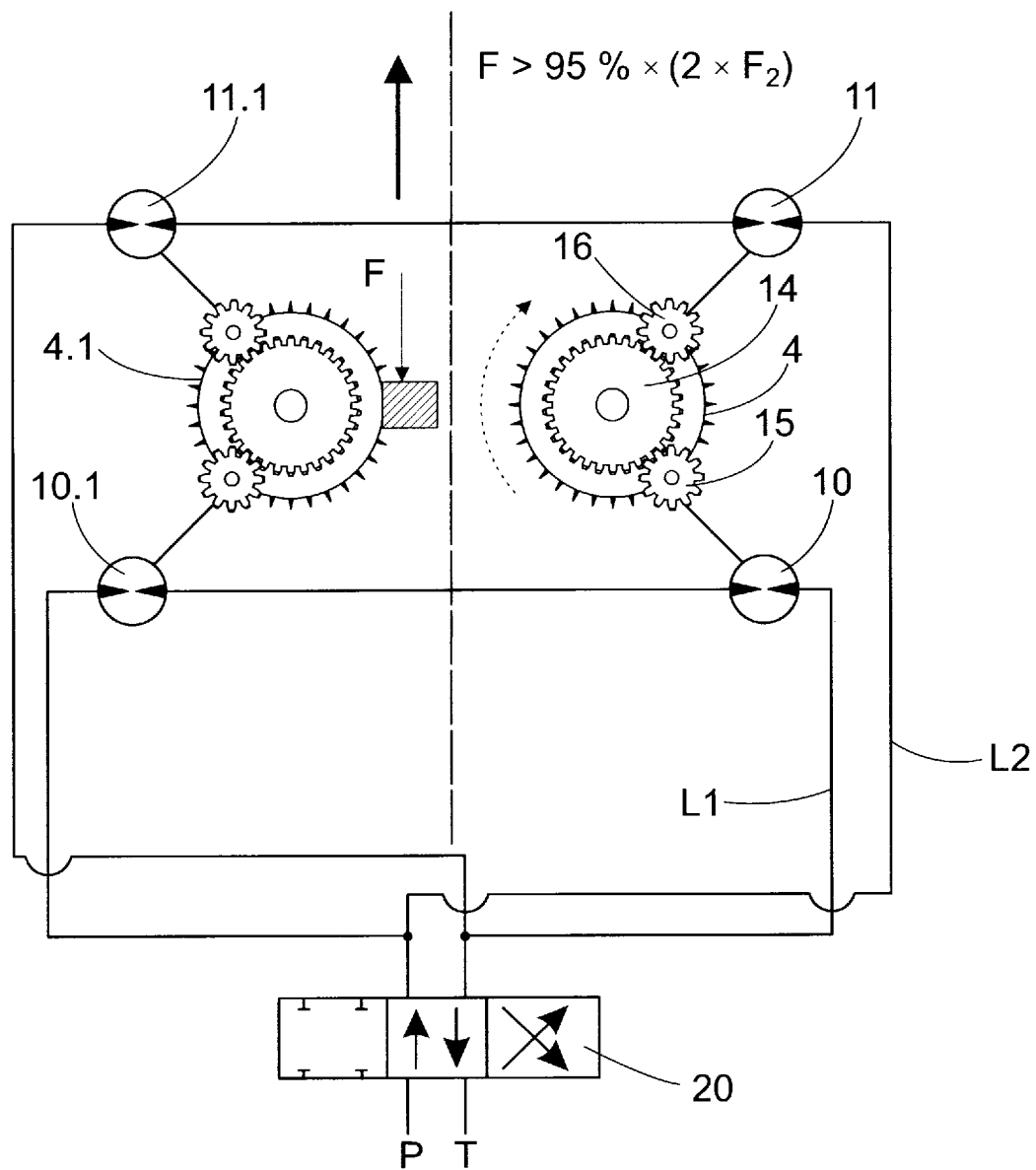
FIGS. 6*a* and 6*b* show the annular forces of the feed roller in normal and one-sided loading situations.

In an imaginary situation (FIG. 6a), when there is, for example, ice or snow of top of feed roller 4, only feed roller 4.1 can pull. Further envisage that the torque of roller 4.1 is now insufficient. Now, for example, when the directional control valve 20 is in the position "direct", pressurized oil comes to motor 10.1, but cannot pass through, because the roller is "locked". However, motor 10.1 develops a torque that is about double, because the whole pressure acts over this motor, motor 10 being "idle".

Correspondingly, the same pressure acts on motor 11, but as it is "idle" this pressure bypasses it nearly without loss and acts on 11.1. When the whole pressure level acts on motor 11.1, a torque develops in it that is nearly double the normal level.

Figure 6B:
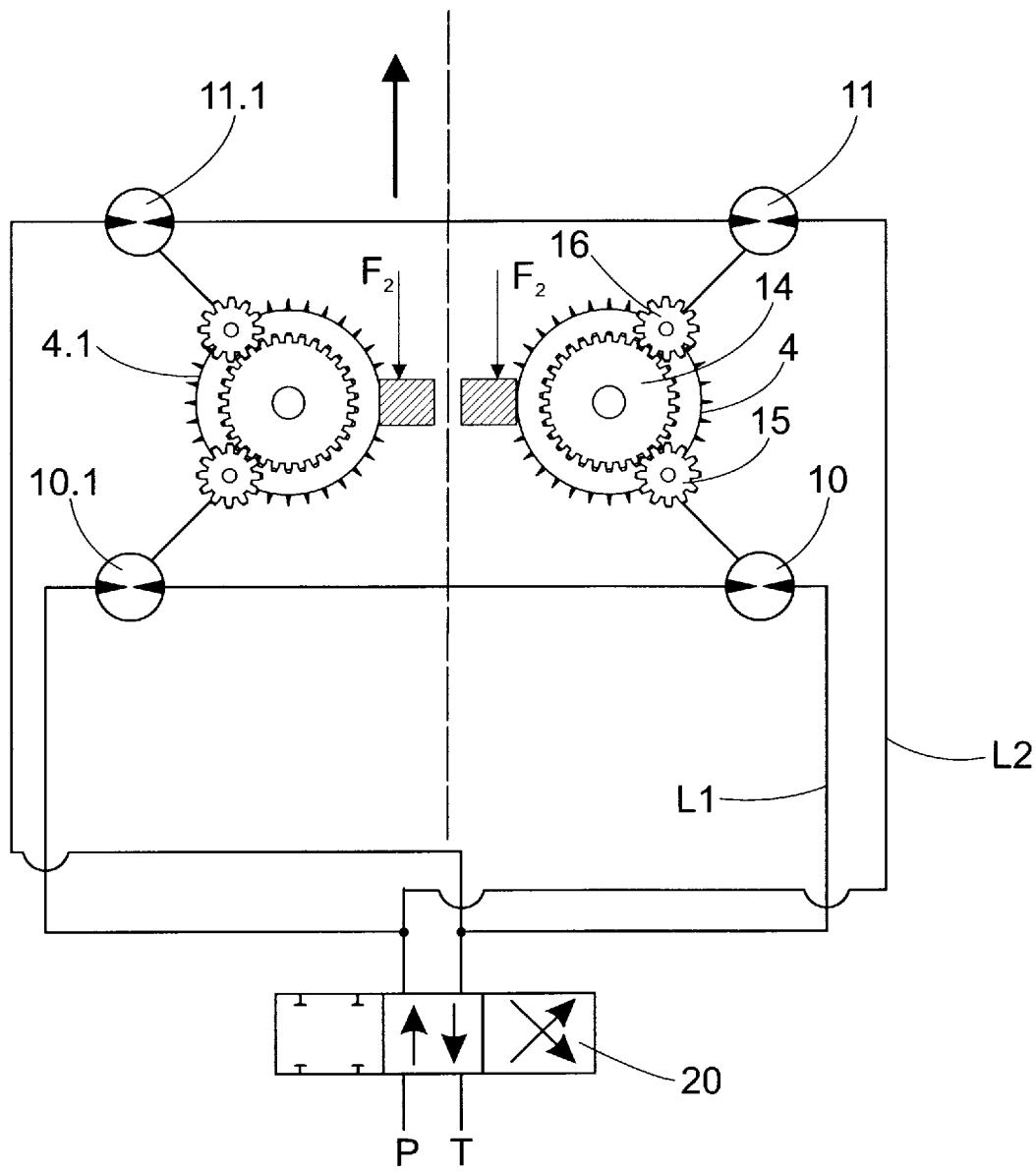

In normal running, one motor creates half of the maximum torque (FIG. 6b). In other words the normal torque F of one roller pulling by itself is twice one motor's normal torque $F_2$ in symmetrical traction. More specifically, it can be estimated that $F > 95\% \times (2 \times F_2)$, which has also be measured on the test bench.

If we sum the torque coming to the roller 4.1 in the imaginary case, it totals nearly four times the normal torque of one motor. From this it follows that, in the feeding apparatus according to the invention, when one roller is "idle", the other feed roller that has held its grip will develop a torque that it nearly two times greater. I.e., even though one roller is "idle", the other roller is able by itself to create the same tractive force as both rollers normally.

Further, the direction of rotation does not matter now, i.e. whether the direction is feeding or reverse. Operation is completely symmetrical in both directions. Operation does not demand throttling in the feed line, instead operation is naturally very flexible. The forward feeding direction is marked with an arrow FF Fbeside the tree 5 on FIG. 5.

Because the roller is on a separate shaft, the width of the roller can be changed, nor will this affect the shafts of the motors. Thus, commercial motors can be found easily.

The hydraulic motors preferably used in the feeding apparatus according to the invention are Danfoss OMT orbital motors having gear rim with rollers (0.3-0.4 liters/s).

Figure 7:
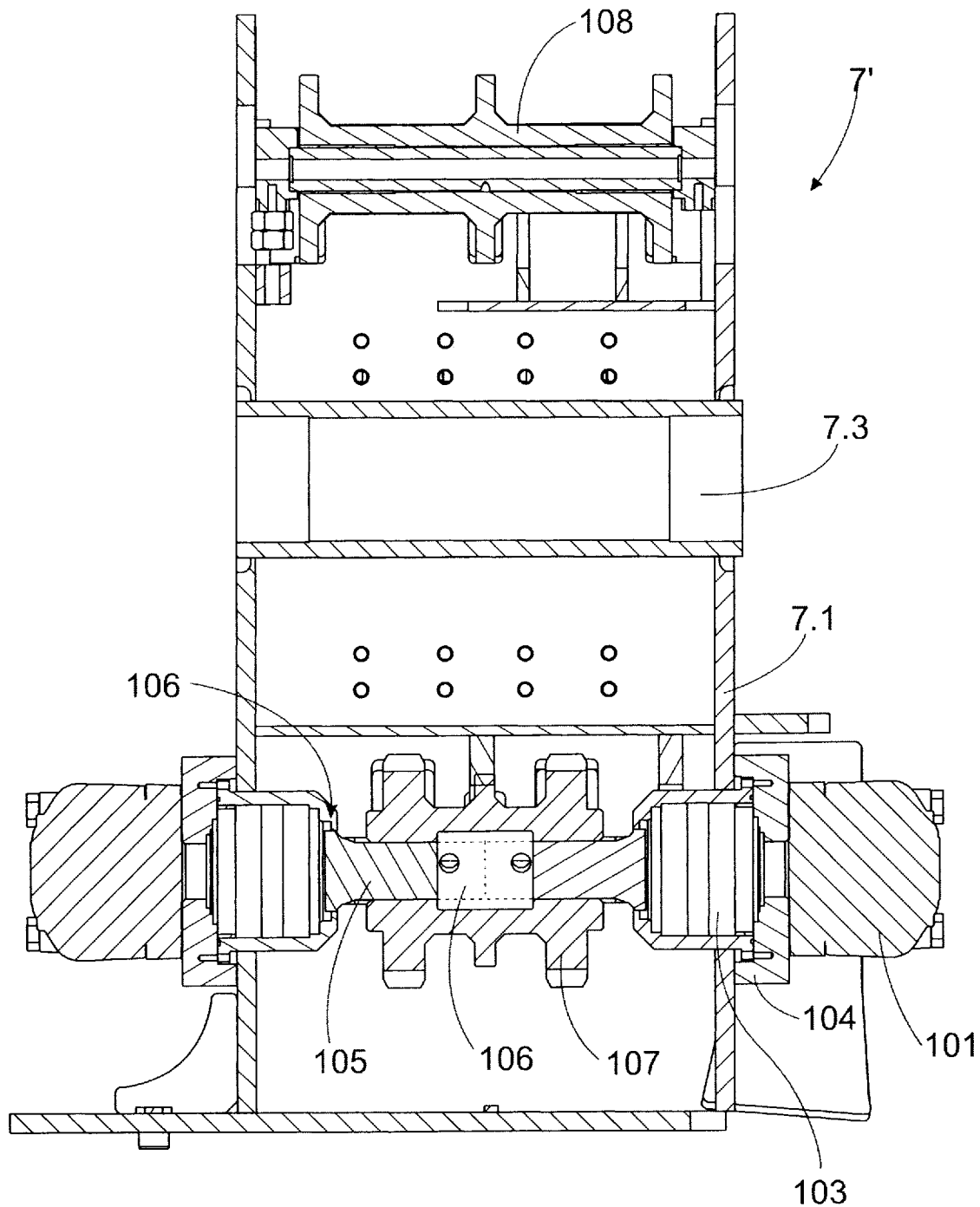
FIG. 7 shows a track feeder embodiment of the invention.

FIG. 7 shows an embodiment utilizing a track feeder as the feed device instead of a feed roller shown in FIGS. 1-6*b*. The previous application of the applicant US2006/0086414 A1 is incorporated with reference and shows in more detailed manner the structure of a track feeder as shown in FIG. 7. The track feeder 7' has a frame 7.1 which in this embodiment acts as the auxiliary frame connecting the hydraulic motors 101 to each other. The track feeder 7' is attached using a pivot axle through the pivot tube 7.3 of the frame 7.1 so that the track feeder 7' can be freely moving around the pivot to conform the tree being fed. The hydraulic motors 101 on the opposite sides of the frame 7.1 are attached via attachment flanges 104 to the frame 7.1. The drive axle 105 is supported by gear rims 103 on both ends. Each gear rim 103 includes bearings that allow the drive axle 105 to rotate. The gear rims 103 are connected to the attachment flanges 104. The torque is transmitted from the hydraulic motors 101 to the drive axle 105 using splines 106 belonging at each end of the drive axle 105. Opposite motors have gear rims to carry the drive sprocket. There is no torsion to the motors. A drive sprocket driving 107 the track of the track feeder 7' is fixed on the drive axle 105. The track is also supported by the idler sprocket 108.

The invention claimed is:

1. Feeding apparatus for a harvester, comprising:
opposing arms, namely a first arm and a second arm, with operating devices, pivoted to a frame, for creating transverse compression;
two opposing auxiliary frames, namely a first auxiliary frame and a second auxiliary frame, the first auxiliary frame being installed in the first arm and the second auxiliary frame being installed in the second arm;
two opposing feed devices, namely a first track feeder and a second track feeder, the first track feeder being installed in the first auxiliary frame and the second track feeder being installed in the second auxiliary frame, the first track feeder and the second track feeder acting as the only feed devices for feeding a tree through a throat, wherein the feed devices both have an operating state for feeding the tree forward towards the throat, namely forward operating state;
a first set of hydraulic motors installed in the first auxiliary frame, comprising a first hydraulic motor and a second hydraulic motor on opposite sides of the first auxiliary frame, both driving the first track feeder, thus the first track feeder creating a mechanical connection between the first hydraulic motor and the second hydraulic motor of the first track feeder, the first hydraulic motor having a first inlet and a first outlet and the second hydraulic motor having a second inlet and a second outlet;
a second set of hydraulic motors installed in the second auxiliary frame, comprising a third hydraulic motor and a fourth hydraulic motor on opposite sides of the second auxiliary frame, both driving the second track feeder, thus the second track feeder creating a mechanical connection between the third hydraulic motor and the fourth hydraulic motor of the second track feeder, the third hydraulic motor having a third inlet and a third outlet and the fourth hydraulic motor having a fourth inlet and a fourth outlet;
a tank line for returning hydraulic fluid from the hydraulic motors to a tank;
a first parallel hydraulic fluid line operating the first hydraulic motor of the first track feeder and the third hydraulic motor of the second track feeder, wherein the hydraulic fluid in the forward operating state is fed first to the first inlet of the first hydraulic motor, then from the first outlet of the first hydraulic motor to the third inlet of the third hydraulic motor, and then from the third outlet of the third hydraulic motor to the tank line, when feeding tree, and;
a second parallel hydraulic fluid line operating the second hydraulic motor of the first tracker feeder and the fourth hydraulic motor of the second track feeder in series, wherein the hydraulic fluid in the forward operating state is fed first to the fourth inlet of the fourth hydraulic motor, then from the fourth outlet of the fourth hydraulic motor to the second inlet of the second hydraulic motor, and then from the second outlet of the second hydraulic motor to the tank line, when feeding tree.

2. The feeding apparatus according to claim 1, wherein the first hydraulic motor and the third hydraulic motor connected in series are of the same size and of a single capacity and the second hydraulic motor and the fourth hydraulic motor connected in series are of the same size and of a single capacity.

3. The feeding apparatus according to claim 1 wherein the width of both the first track feeder and the second track feeder is 50-150% of its diameter.

4. The feeding apparatus according to claim 1 wherein the path of movement of both the first track feeder and the second track feeder is arranged to be essentially linear, the maximum linear deviation being 1-6% of the lateral displacement.

5. The feeding apparatus according to claim 1, wherein the first arm carrying the first track feeder and the second arm carrying the second track feeder are both trapezium arms.

6. A harvester, which includes:
a frame with suspension devices, being in the longitudinal direction of the frame,
stripping blades pivoted to the frame, with operating devices, for compressing the stripping blades transversely in order to form a throat, and
a feeding apparatus according to claim 1.

* * * * *